United States Patent
Zhao et al.

(10) Patent No.: US 7,333,483 B2
(45) Date of Patent: Feb. 19, 2008

(54) INTEGRATED MOBILE GATEWAY DEVICE USED IN WIRELESS COMMUNICATION NETWORK

(75) Inventors: Yongxiang Zhao, Shenzhen (CN); Lian Yang, Shenzhen (CN); Tao Peng, Shenzhen (CN); Zhijun Zhang, Shenzhen (CN); Xingwang Huang, Shenzhen (CN); Zhi Zeng, Shenzhen (CN); Wenxian Li, Shenzhen (CN)

(73) Assignee: Huawei Technologies Co., Ltd., Shenzhen Guangdong Province (CN)

( * ) Notice: Subject to any disclaimer, the term of this patent is extended or adjusted under 35 U.S.C. 154(b) by 628 days.

(21) Appl. No.: 10/956,674

(22) Filed: Oct. 1, 2004

(65) Prior Publication Data

US 2005/0094629 A1  May 5, 2005
US 2005/0201367 A9  Sep. 15, 2005

Related U.S. Application Data

(63) Continuation of application No. PCT/CN03/00077, filed on Jan. 27, 2003.

(51) Int. Cl.
*H04L 12/66* (2006.01)
(52) U.S. Cl. .................. 370/356; 370/401; 370/466
(58) Field of Classification Search .............. None
See application file for complete search history.

(56) References Cited

U.S. PATENT DOCUMENTS 6,614,781 B1 * 9/2003 Elliott et al. ............. 370/352
6,711,241 B1 * 3/2004 White et al. ............. 379/88.17

FOREIGN PATENT DOCUMENTS

| EP | 0 959 600 A1 | 11/1999 |
| WO | WO 96/13132 A1 | 5/1996 |
| WO | WO 00/33518 A2 | 6/2000 |
| WO | WO 00/79827 A1 | 12/2000 |

* cited by examiner

*Primary Examiner*—Jay K. Patel
*Assistant Examiner*—Jung Park
(74) *Attorney, Agent, or Firm*—Courtney Staniford & Gregory LLP

(57) ABSTRACT

Embodiments of the invention include a universal integrated mobile gateway used in wireless communication networks to interconnect different networks, comprising: AMP for data collocation and state management for other modules, CCM for data switching network management (together with other modules) and control data frame switching between modules, CDP for storage and management of relay resource and global shared resources, SPCs for processing services in different networks, and network interface; CCM is connected with AMP, CDP, and SPCs through HDLC protocol; SPCs are connected to the network interface through TCP/IP protocol. The embodiments improve normalization and operability of network interconnection, facilitate unified settlement between different networks, and enhance overall resource utilization of the networks.

4 Claims, 4 Drawing Sheets

INTEGRATED MOBILE GATEWAY DEVICE USED IN WIRELESS COMMUNICATION NETWORK

RELATED APPLICATIONS

This application is a continuation of Patent Cooperation Treat (PCT) Application No. PCT/CN03/00077, filed Jan. 27, 2003, which designates the United States, and which claims priority from Chinese Patent Application No. 02116536.1, filed Apr. 3, 2002.

FIELD OF THE INVENTION

The present invention relates to a mobile gateway device used in wireless communication network.

BACKGROUND OF THE INVENTION

Presently, there are diverse wireless communication networks, such as the most popular GSM (Global System for Mobile communications) network, GPRS network and CDMA network. Since different operators possess their own wireless communication networks and different services and customer bases, the networks of any single operator are not perfect in services and coverage; therefore, in order to implement optimized configuration and mutual complementation between different networks of operators, interconnection is required. In order to implement network interconnection, mobile gateway devices are usually deployed in different networks as portals to other networks. However, existing mobile gateway devices only possess modules that handling internal services and only provide interconnecting interfaces. Therefore the mobile gateway devices only deliver an inter-network connection function. Furthermore, diverse interfaces between networks are difficult to manage and maintain. Because there is no universal external interface between networks of different operators, network structure adjustment involves arduous external coordination work, such as relay, signaling links and signaling data. As a result, the overall resource utilization and working efficiency of networks are degraded.

With existing mobile gateway devices, inter-communication and settlement between networks of operators have to be carried out through the mobile gateway devices. Thus each private network requires its own mobile gateway devices, which leads to increased settling points, complicated settling relationships, and also slows down network construction.

SUMMARY OF THE INVENTION

An object of the present invention is to provide a universal integrated mobile gateway device used in wireless communication networks that enhances normalization and operability of network interconnection, unifies internal settlement, reduces wireless network investment and operating costs, and improves overall resource utilization and working efficiency of wireless networks.

To attain said object, the universal integrated mobile gateway device used in wireless communication network according to embodiments of the present invention comprises: AMP (Administration and Management Processor), CCM (Communication Control Module), CDP (Central Database Processor), a plurality of SPCs (Service Processing Controllers) and network interfaces; CCM is connected with AMP, CDP and SPCs, respectively; AMP, CDP, and SPCs are connected to network interfaces, respectively; wherein:

AMP is designed to perform data configuration and state collection for other modules, monitor state, management and failure handling for other modules, as well as receive all maintenance commands from background modules and accomplish processing and forwarding of relevant commands;

CCM is designed to manage the data switching network consisting of CCM, AMP, CDP, and SPC connected with each other, accomplish control data frame switching between said modules;

CDP is designed to store and manage relay resources and global shared resources;

SPCs are designed to process services in different networks, implement traffic convergence of physical entities as well as gateway and SSP (Service Switching Point) functions, accomplish protocol processing of layers above the link layers of SS7 (Signaling System 7), DSS1 (Data Subscriber Signaling System No. 1) and No. 1 signaling, and accomplish service processing in the mobile switching system.

Said SPC comprises a fixed network SPC (F_SPC), a GSM network SPC (G_SPC) and a CDMA (Code Division Multiplexing Access) SPC (C_SPC); said F_SPC, G_SPC, and C_SPC are connected to each other through internal buses and are designed to implement traffic convergence for physical entities, functions of gateway and SSP for fixed communication networks, GSM networks and CDMA networks respectively, accomplish protocol processing of layers above the link layers of SS7, DSS1 and No. 1 signaling in the corresponding network, and accomplish service processing in the corresponding systems.

Since the present invention combines different network functions in fixed communication networks, GSM networks, and CDMA networks and utilizes SPCs in different networks to process services in corresponding networks, it can manage diverse network resources centrally and implement global resource sharing within the network coverage of the integrated gateway. Compared to a single gateway, it can enhance normalization and operability of network interconnection, facilitate internal settlement between different networks, reduce investment of operators, and improve overall resource utilization and efficiency of networks.

DETAILED DESCRIPTION OF THE EMBODIMENTS

Hereunder the present invention will be described in further detail with reference to the attached drawings.

Figure 1:
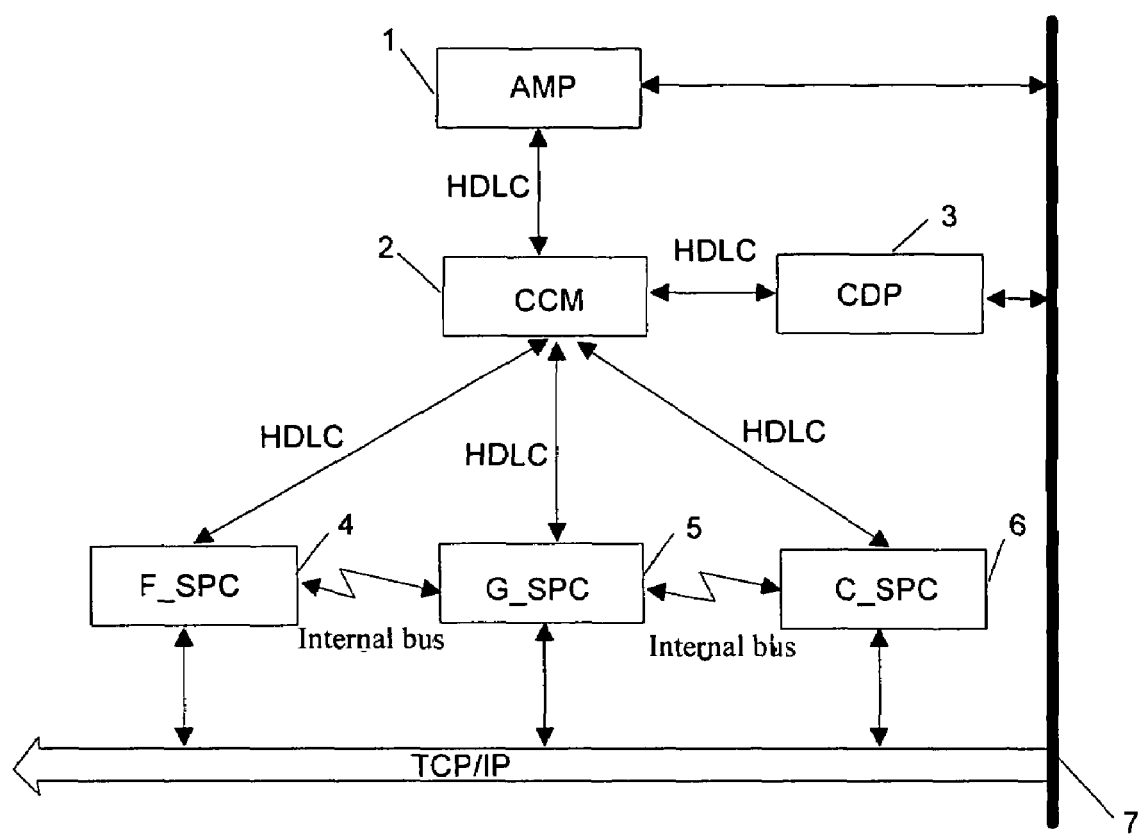
FIG. 1 is a block diagram of an embodiment of the present invention.

FIG. 1 is a block diagram of an embodiment of the present invention. The integrated gateway shown in FIG. 1 is an integrated operation/maintenance/support platform for services in fixed networks, GSM networks and CDMA networks. It integrates all existing operation/maintenance functions in above networks effectively, provides unified signaling routing, relay routing and configuration functions, and combines routing function of switching gateway. Embodiments of the integrated gateway provide the advantages of effective resource sharing and unified management and control.

Figure 2:
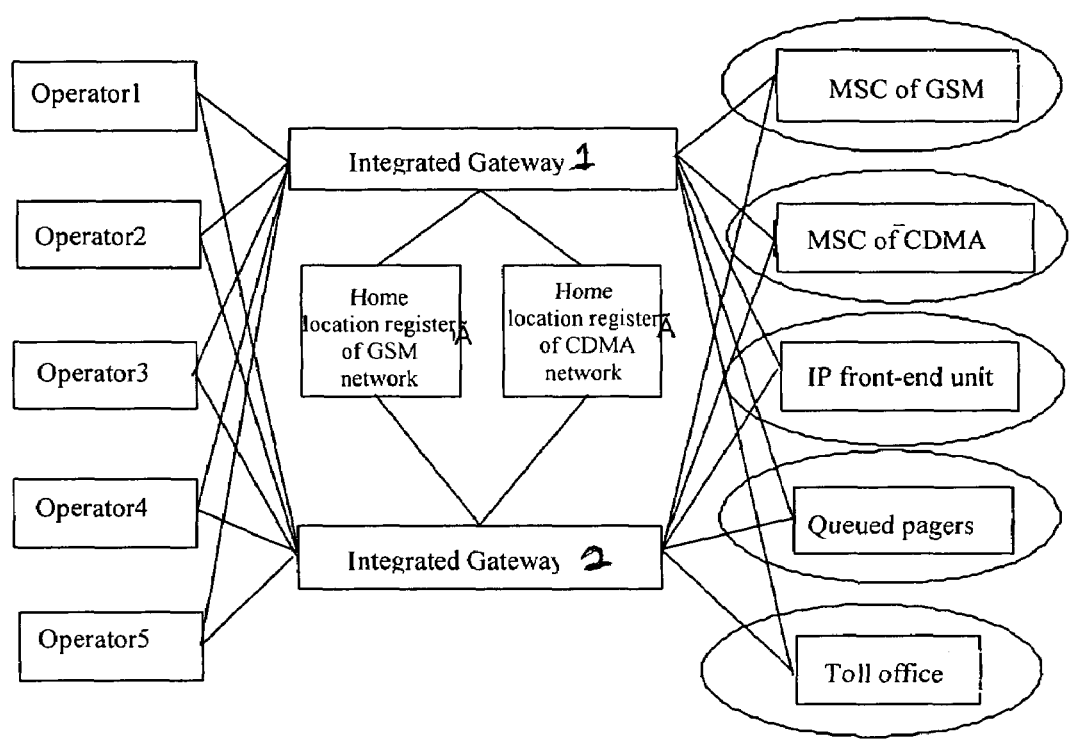
FIG. 2 is a schematic block diagram of the integrated gateway in the application environment.

Please see FIG. 2, which shows the application environment of the integrated gateway. As shown in FIG. 2, the integrated gateway serves as an integrated external interface for an operator to connect to different communication networks of other network operators. For example, the integrated gateway 1 of an operator in FIG. 2 connects GSM MSC, CDMA MSC, and IP front-end units of the operator. As an interconnecting gateway between local networks (GSM networks, CDMA networks, data networks, relay networks, and SMS networks) of an operator and networks of other operators and enterprise private networks, the integrated gateway delivers an interface to other networks and accomplishes authentication, accounting, and settlement. It serves as a shared gateway for all local networks of the operator. In addition, as the interconnecting gateway among the private networks of the operator, the integrated gateway interconnects interfaces between local networks and is responsible for authentication, accounting and settlement between the networks. Therefore, the integrated gateway doesn't simply superimpose functions of original gateways in GSM and CDMA networks; instead, it integrates those gateways to provide unified processing for services, signaling, resources, operation & maintenance, traffic statistics, and alarms.

Figure 3:
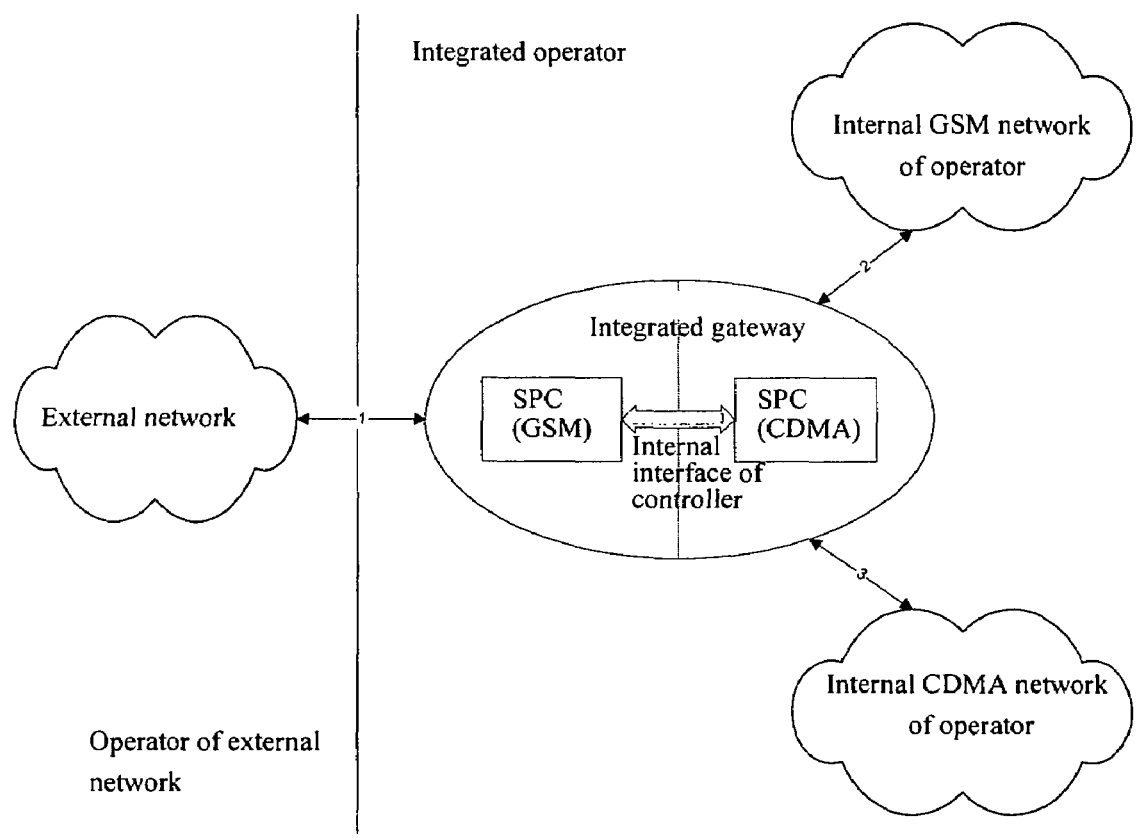
FIG. 3 is an example of networking with the integrated gateway.

FIG. 3 is an example of networking with the integrated gateway. As shown in FIG. 3, because the integrated gateway connects different communication networks of the operator (e.g., GSM network and CDMA network in FIG. 3), SPCs in the integrated gateway are classified and controlled centrally, in order to process services in different communication networks.

The integrated gateway as described above will now be further described with reference again to FIG. 1. The universal integrated mobile gateway device for wireless communication networks according to an embodiment comprises: AMP 1, CCM 2, CDP 3, SPCs 4, 5, 6, and network interface 7; wherein CCM 2 is connected to AMP 1, CDP 3, and SPCs 4, 5, 6 respectively; AMP 1, CDP 3, and SPCs 4, 5, 6 are connected to network interface 7, respectively; said CCM 2 is connected to AMP 1, CDP 3, and SPCs 4, 5, 6 through HDLC protocol; said SPCs 4, 5, 6 are connected to the network interface through TCP/IP (Transfer Control Protocol/Internet Protocol) protocol.

Above SPCs 4, 5, 6 are F_SPC, G_SPC, and C_SPC, respectively; above F_SPC 4, G_SPC 5, and C_SPC 6 are connected to each other through an internal bus and are designed to implement traffic convergence for physical entities, functions of gateway and SSP for fixed communication networks, GSM networks and CDMA networks respectively, accomplish protocol processing of layers above the link layers of SS7, DSS1 and No. 1 signaling in the corresponding network, and accomplish service processing in the corresponding systems.

Wherein:

AMP 1 is designed to carry out data collocation and state collection for other modules; it monitors state, manage and failure handling for other modules as well as receive all maintenance commands from background modules and accomplish processing and forwarding of relevant commands;

CCM 2, along with AMP, CDP, and SPC, accomplishes management of the data switching network and control data frame switching between modules;

CDP 3 is designed to store and manage relay resource and global shared resources;

SPC 4 is designed to process services in different networks, implement traffic convergence for physical entities, functions of gateway and SSP, accomplish protocol processing of layers above the link layers of SS7, DSS1 and No. 1 signaling, and accomplish service processing in the mobile switching systems.

As described above, two or more SPCs that process different services are connected to CCM via HDLCs; said SPCs are connected to each other through an internal bus; said SPCs are connected to other networks (e.g., LANs) via serial HDLCs through TCP/IP protocol. F_SPC, G_SPC, and C_SPC are connected to CCM via serial synchronous HDLCs. Said F_SPC, G_SPC, and C_SPC are connected with LANs via serial synchronous HDLCs through TCP/IP protocol respectively. Said F_SPC, G_SPC, and C_SPC are connected to each other through an internal bus. The SPCs are implemented with single board modules or rack modules.

The SPCs may be identical in physical design and logical design; while general-purpose single boards, buses, interfaces, and other general-purpose devices may be different in design and implementation. That is to say, a series of said integrated gateways may be implemented with general-purpose single boards, buses, interfaces, and other general-purpose devices.

When SPCs identical in physical design and logical design are used as functional modules for different networks, the difference among those SPCs for different services lies in the arbitration software loaded for processing corresponding network services.

Figure 4:
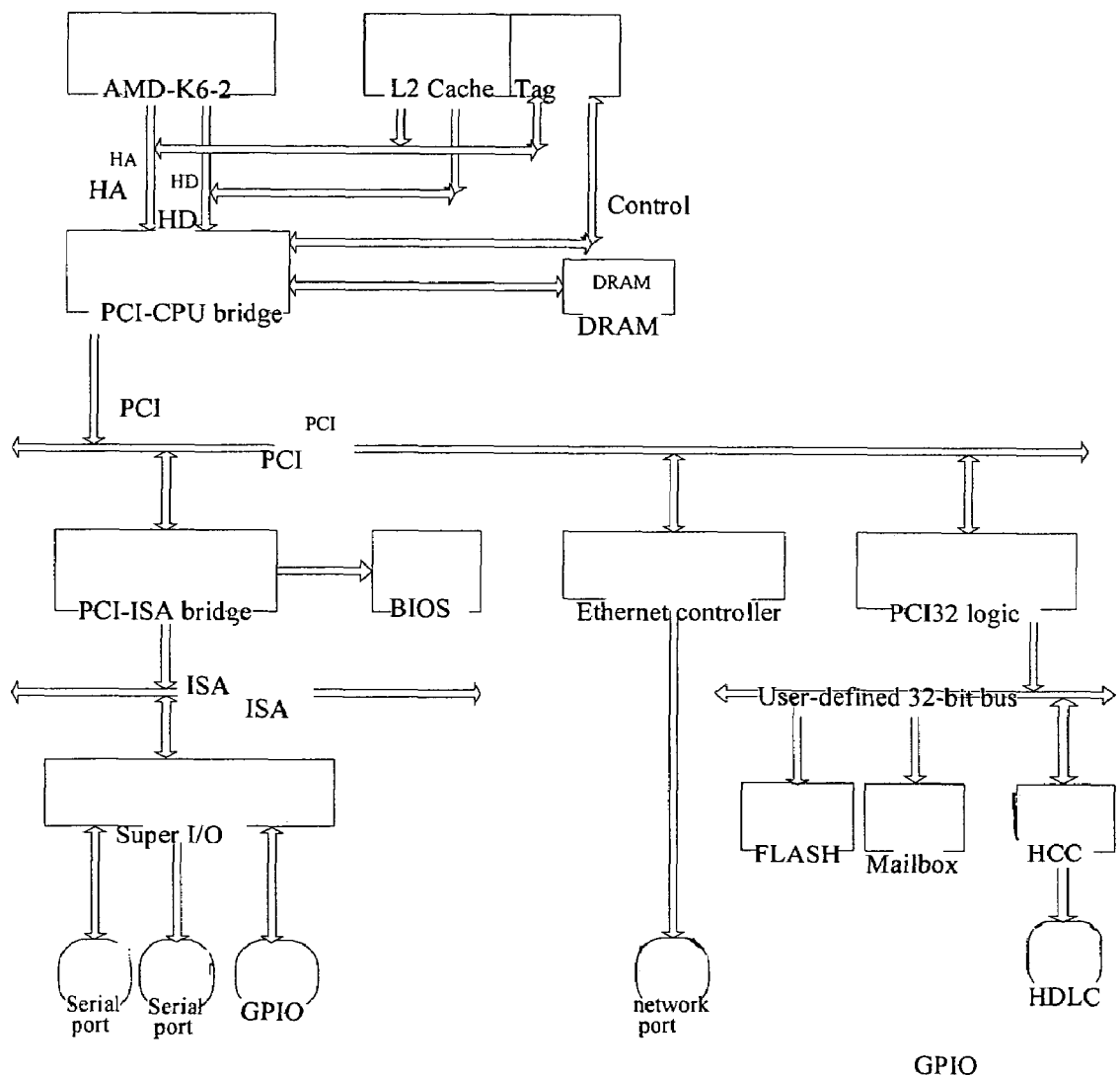
FIG. 4 is a structural diagram of an embodiment of SPC.

As shown in FIG. 4, a SPC mainly comprises a minimum control system, a network port controller, a bus conversion logic module, a serial interface communication control module, and a mailbox controller. The minimum control system comprises a CPU, a PCI-ISA Bridge, a BIOS, and a DRAM. A CPU module comprises an AMD K6-2 CPU, a level 2 Cache, a register TAG, and a PCI-CPU Bridge. The CPU module employs a CPU bus for internal communication; the PCI-CPU Bridge accomplishes conversion from PCI bus to CPU bus and provides a DRAM access interface. The PCI-ISA Bridge accomplishes conversion from PCI bus to ISA bus. DRAM is the storage medium of program and data. BIOS stores system initiation codes and onboard support software BSP for embedded operating system PSOS. The bus conversion logic module employs PCI32-logic module to achieve conversion from PCI bus to user-defined 32-bit bus and then provide 24-bit address bus, 32-bit data bus, and partial I/O space. The network port controller employs an Ethernet controller to achieve conversion from PCI bus interface to 10/100 Ethernet control interface. Other network port controllers are also acceptable.

The mailbox portion of SPC module comprises two parts: one part is used to interface with motherboard bus and accomplish communication with back-plate or other cards in the module through data transfer via HDLC HCC card; the other part is used to communicate with HDLC control module. The serial-interface CCM employs a HDLC communication control module. It is implemented by a pinch plate HCC on the SPC module; HCC comprises two MPC860 system, each of which provides 2 2M signaling buses (HW). SPC module communicates with other modules via the HWs. HCC also provides an escape serial port and a RS232 serial port for printing debugging information. HCC also communicates with SPC motherboard through the mailbox.

If the integrated gateway shown in FIG. 1 is applied to the environment shown in FIG. 2, the call processing between different networks is as follows:

When a user in an external network calls a CDMA network user of the integrated operator, the call is routed from the external network to the integrated gateway (path 1) and then from the integrated gateway to the CDMA network of the operator (path 3).

On path 1, the user in the external network initiate a call to the CDMA network user of the operator; the call is routed through the gateway of the external network to the integrated gateway of the operator, and then on path 3, the integrated gateway judges the called user is a CDMA network user according to characteristics of the call user and sets up the call on the SPC that processes. CDMA services (C_SPC); next, C_SPC routes the call to the internal CDMA network through normal CDMA call procedures.

When a GSM network user of the operator calls a CDMA network user of the operator, the call is routed from the GSM network to the integrated gateway (path 2) and then from the integrated gateway to the CDMA network (path 3).

First, on path 1, the GSM network user initiates a call to the CDMA network user; the call is routed to the integrated gateway; then, on path 3, the integrated gateway judges the called user is a CDMA network user according to characteristics of the called user and sets up the call on the service module that processes CDMA services (C_SPC); C_SPC routes the call to the CDMA network through normal CDMA call procedures.

If a user of an external network calls a GSM network user of the operator and the called user has roamed into the CDMA network of the operator, the call is routed from the external network to the integrated gateway (path 2) and then from the integrated gateway to the CDMA network (path 3).

First, on path (1), the user in the external network initiates a call to the GSM network user; the call is routed from the gateway of the external network to the integrated gateway of the operator; then, on path 3, the integrated gateway judges the called user is a GSM network user according to characteristics of the called user and sets up the call on the service module that processes GSM services (G_SPC); when G_SPC retrieves the roaming number, it finds the GSM user has roamed to the CDMA network; therefore, G_SPC transfers the call to the service module that processes CDMA service (G_SPC) via the internal interface; finally, G_SPC routes the call to the CDMA network through normal CDMA call procedures.

What is claimed is:

1. A universal integrated mobile gateway device used in wireless communication networks, comprising: AMP (Administration and Management Processor), CCM (Communication Control Module), CDP (Central Database Processor), a plurality of SPCs (Service Processing Controllers) and network interfaces; CCM being connected with AMP, CDP and SPCs, respectively; AMP, CDP, and SPCs being connected with network interfaces, respectively, wherein AMP is designed to perform data configuration and state collection for other modules, monitor state, manage and failure handling for other modules as well as receive all maintenance commands from background modules and accomplish processing and forwarding of relevant commands;

CCM is designed to manage the data switching network consist of CCM, AMP, CDP, and SPC connected with each other, accomplish control data frame switching between said modules;

CDP is designed to store and manage relay resource and global shared resources;

SPCs are designed to process services in different networks, implement traffic convergence for physical entities and functions of gateway and SSP (service switching point), accomplish protocol processing of layers above the link layers of SS7 (signaling system 7), DSS1 (data subscriber signaling system No. 1) and No. 1 signaling, and accomplish service processing in the mobile switching system.

2. An integrated mobile gateway device according to claim 1, wherein said SPC comprises a fixed network SPC (F_SPC), a GSM (Global System of Mobile communication) network SPC (G_SPC) and a CDMA (Code Division Multiplexing Access) SPC (C_SPC); said F_SPC, G_SPC, and C_SPC are connected to each other through internal buses and are designed to implement traffic convergence for physical entities, functions of gateway and SSP for fixed communication networks, GSM networks and CDMA networks respectively, accomplish protocol processing of layers above the link layers of SS7, DSS1 and No. 1 signaling in the corresponding network, and accomplish service processing in the corresponding systems.

3. An integrated mobile gateway device according to claim 1, wherein said CCM, AMP, CDP, and SPCs are connected with each other through HDLC (High Data Link Control) protocol.

4. An integrated mobile gateway device according to claim 1, wherein said SPCs are connected with the network interfaces through TCP/IP protocol.

* * * * *